Figure 1:
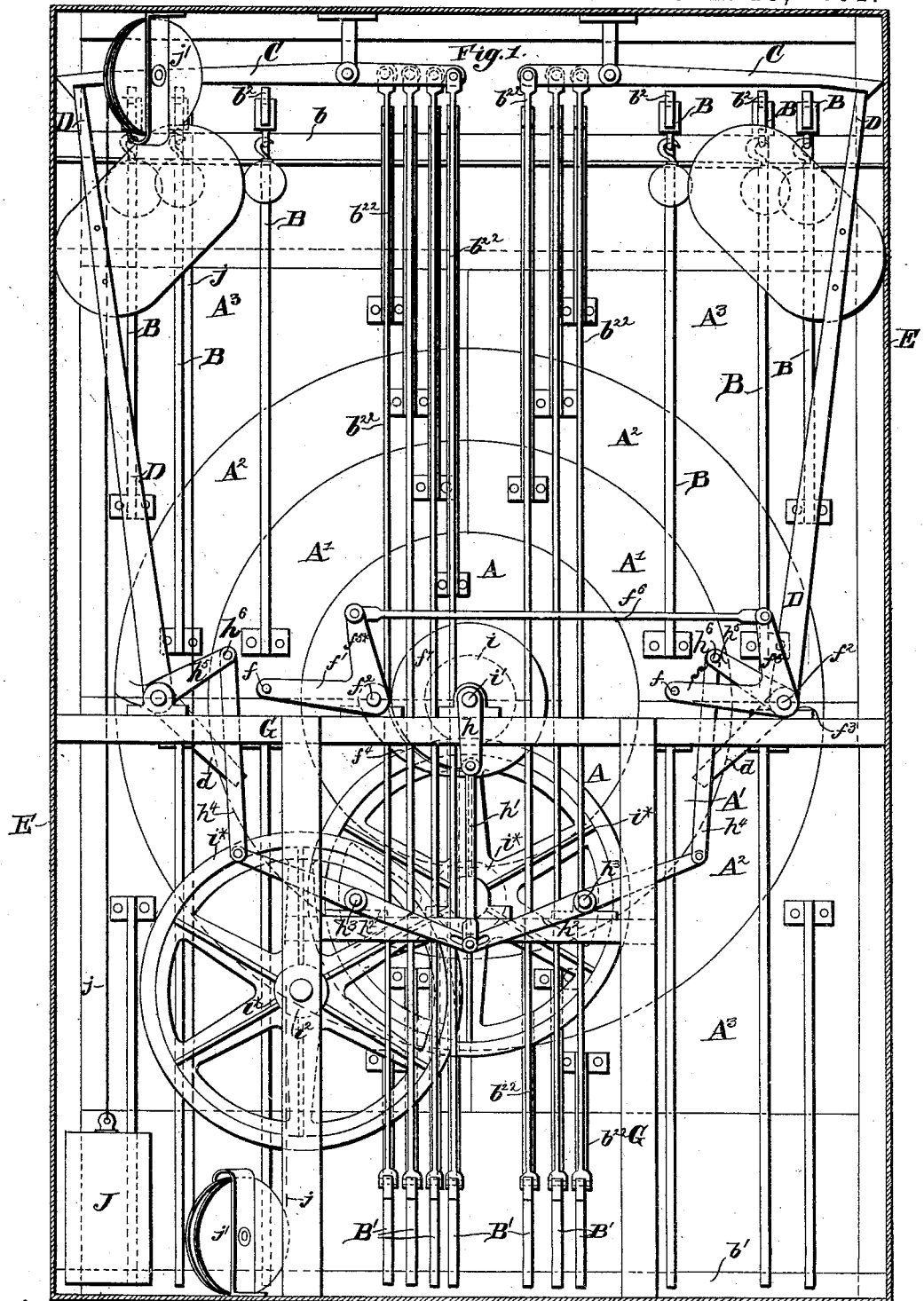

(No Model.) 9 Sheets—Sheet 1.

A. T. M. JOHNSON.
AUTOMATIC SIGNALING TARGET.

No. 444,494. Patented Jan. 13, 1891.

(No Model.) 9 Sheets—Sheet 2.

A. T. M. JOHNSON.
AUTOMATIC SIGNALING TARGET.

No. 444,494. Patented Jan. 13, 1891.

Witnesses: Inventor:
Thomson Cross Arthur T. M. Johnson
Henry G. Dieterich per
Henry ...
Atty's.

THE NORRIS PETERS CO., PHOTO-LITHO., WASHINGTON, D. C.

(No Model.) 9 Sheets—Sheet 4.

A. T. M. JOHNSON.
AUTOMATIC SIGNALING TARGET.

No. 444,494. Patented Jan. 13, 1891.

Witnesses:
J. Thomson Cross
Henry G. Dieterich

Inventor
Arthur T. M. Johnson.
per Henry G.
Atty's (No Model.) 9 Sheets—Sheet 5.

A. T. M. JOHNSON.
AUTOMATIC SIGNALING TARGET.

No. 444,494. Patented Jan. 13, 1891.

Witnesses:
J. Thomson Cross
Henry G. Dieterich

Inventor:
Arthur T. M. Johnson
per [signature]
Atty's (No Model.) 9 Sheets—Sheet 6.

A. T. M. JOHNSON.
AUTOMATIC SIGNALING TARGET.

No. 444,494. Patented Jan. 13, 1891.

Witnesses:
J Thomson Cross
Henry G. Dieterich

Inventor:
Arthur T. M. Johnson
per
Henry Orth
Att'ys.

(No Model.) 9 Sheets—Sheet 7.
A. T. M. JOHNSON.
AUTOMATIC SIGNALING TARGET.

No. 444,494. Patented Jan. 13, 1891.

(No Model.)
9 Sheets—Sheet 8.

A. T. M. JOHNSON.
AUTOMATIC SIGNALING TARGET.

No. 444,494.
Patented Jan. 13, 1891.

Witnesses:
J Thomson Cross
Henry J Dieterich

Inventor:
Arthur T. M. Johnson
per
Henry Orr
Atty's (No Model.) 9 Sheets—Sheet 9.
A. T. M. JOHNSON.
AUTOMATIC SIGNALING TARGET.
No. 444,494. Patented Jan. 13, 1891.
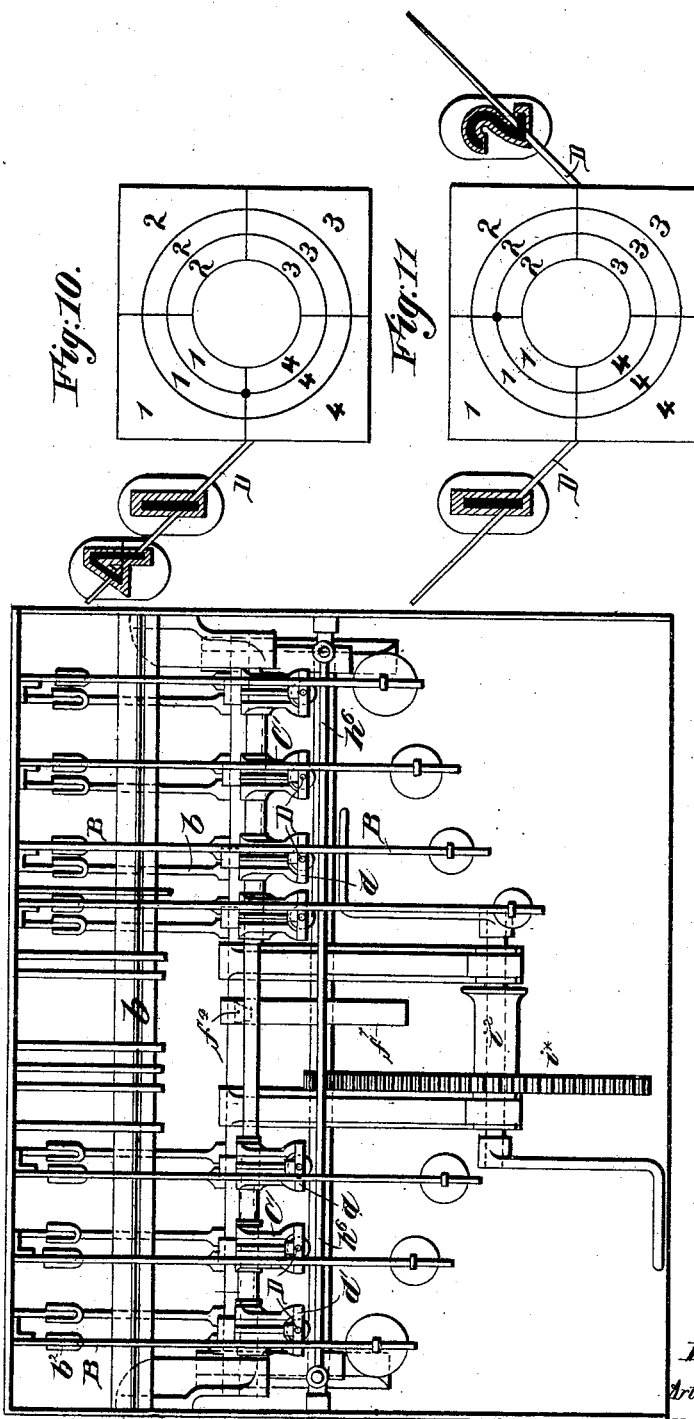
Witnesses:
Thomson Cross
Henry J. Dieterich
Inventor:
Arthur T. M. Johnson
per
Henry Orth
Atty's.

UNITED STATES PATENT OFFICE.

ARTHUR THOMAS METCALF JOHNSON, OF EAST MELBOURNE, VICTORIA.

AUTOMATIC-SIGNALING TARGET.

SPECIFICATION forming part of Letters Patent No. 444,494, dated January 13, 1891.

Application filed January 10, 1890. Serial No. 336,713. (No model.)

*To all whom it may concern:*

Be it known that I, ARTHUR THOMAS METCALF JOHNSON, professor of music, a subject of the Queen of Great Britain, residing at No. 104 Simpson Street, East Melbourne, in the British Colony of Victoria, have invented certain new and useful Improvements in Automatic-Signaling Targets, of which the following is a specification.

This invention has been devised for the purpose of providing a target, intended more especially for rifle practice, which will automatically indicate to the marksman the particular section struck by the bullet, and which will, after a certain prearranged interval, automatically return the signal to its normal position.

The essential feature of my invention is the employment of a target divided into any convenient number of independent parts or sections, each supported upon bell-crank levers operating a pawl or retaining-catch adapted to retain a bar carrying a disk or other signal, and so arranged that upon one of the sections of the target being struck by a bullet the signal indicating such section will be exhibited.

My invention, moreover, comprises means whereby after a prearranged interval the signals will be automatically returned to their normal positions, as will be hereinafter described, reference being had to my drawings, wherein—

Figure 2:
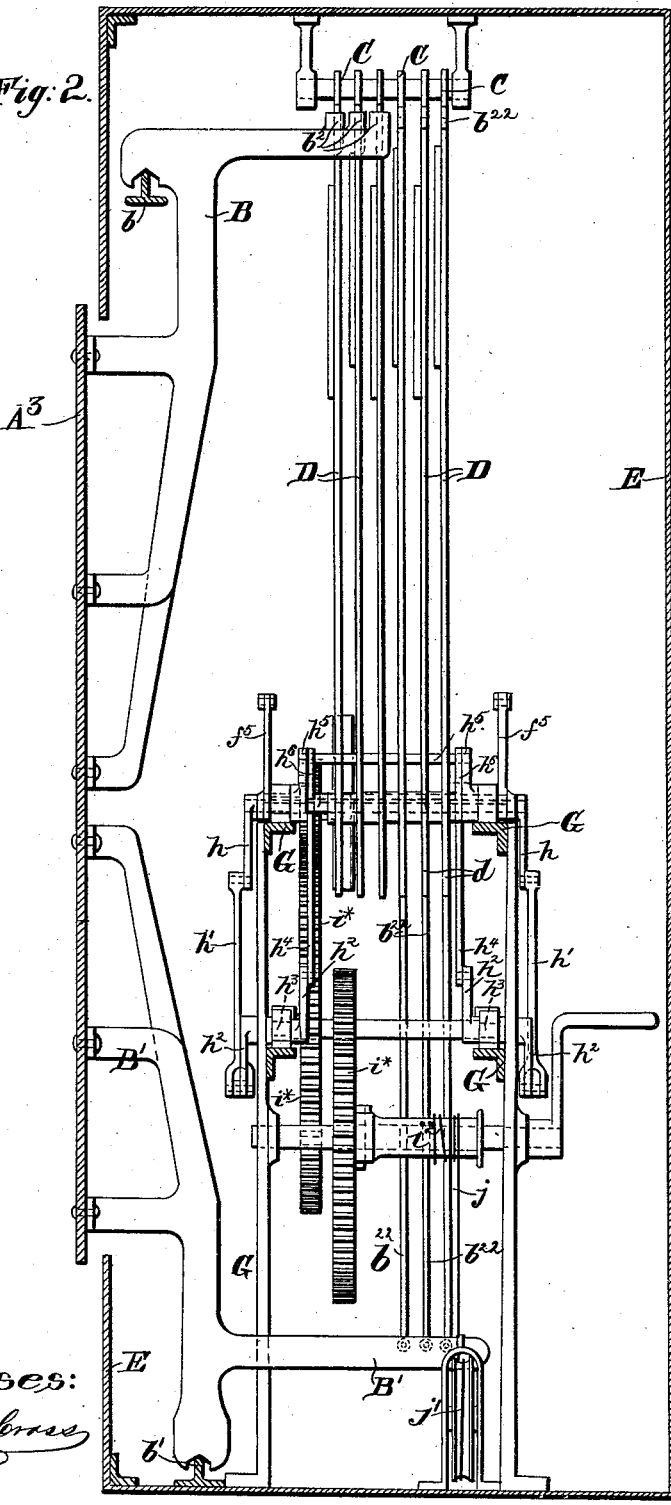
Figure 3:
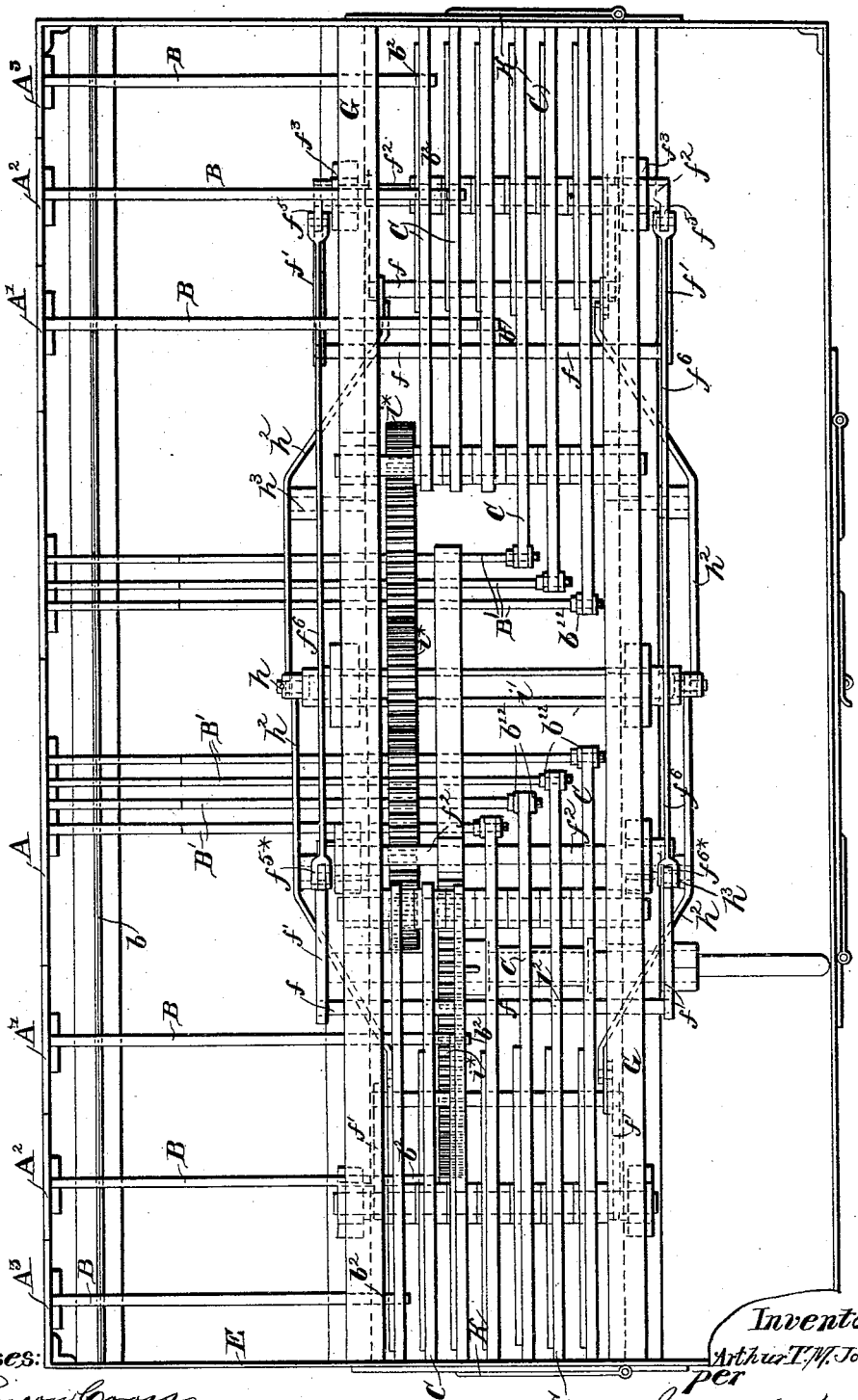
Figure 4:
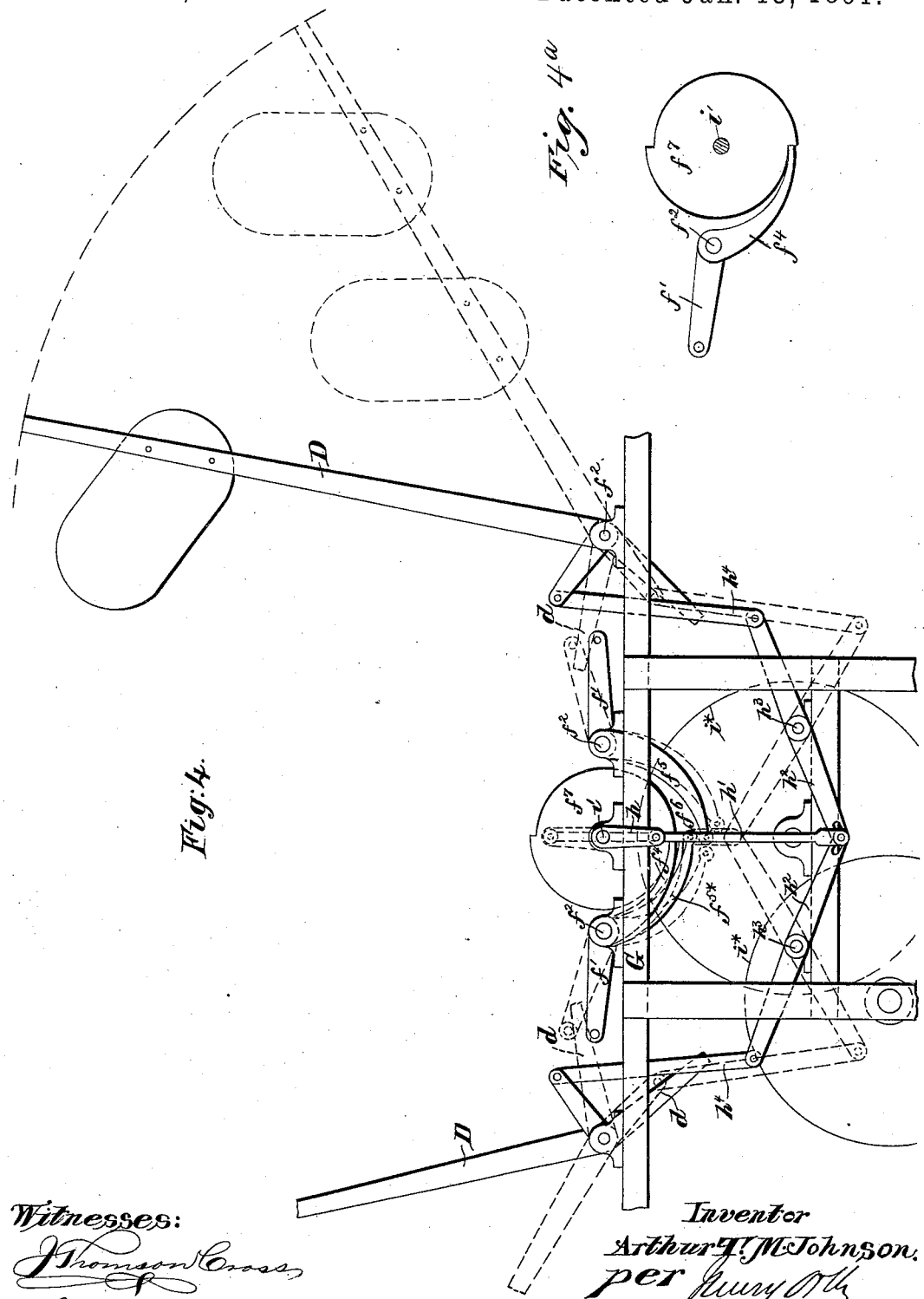
Figure 5:
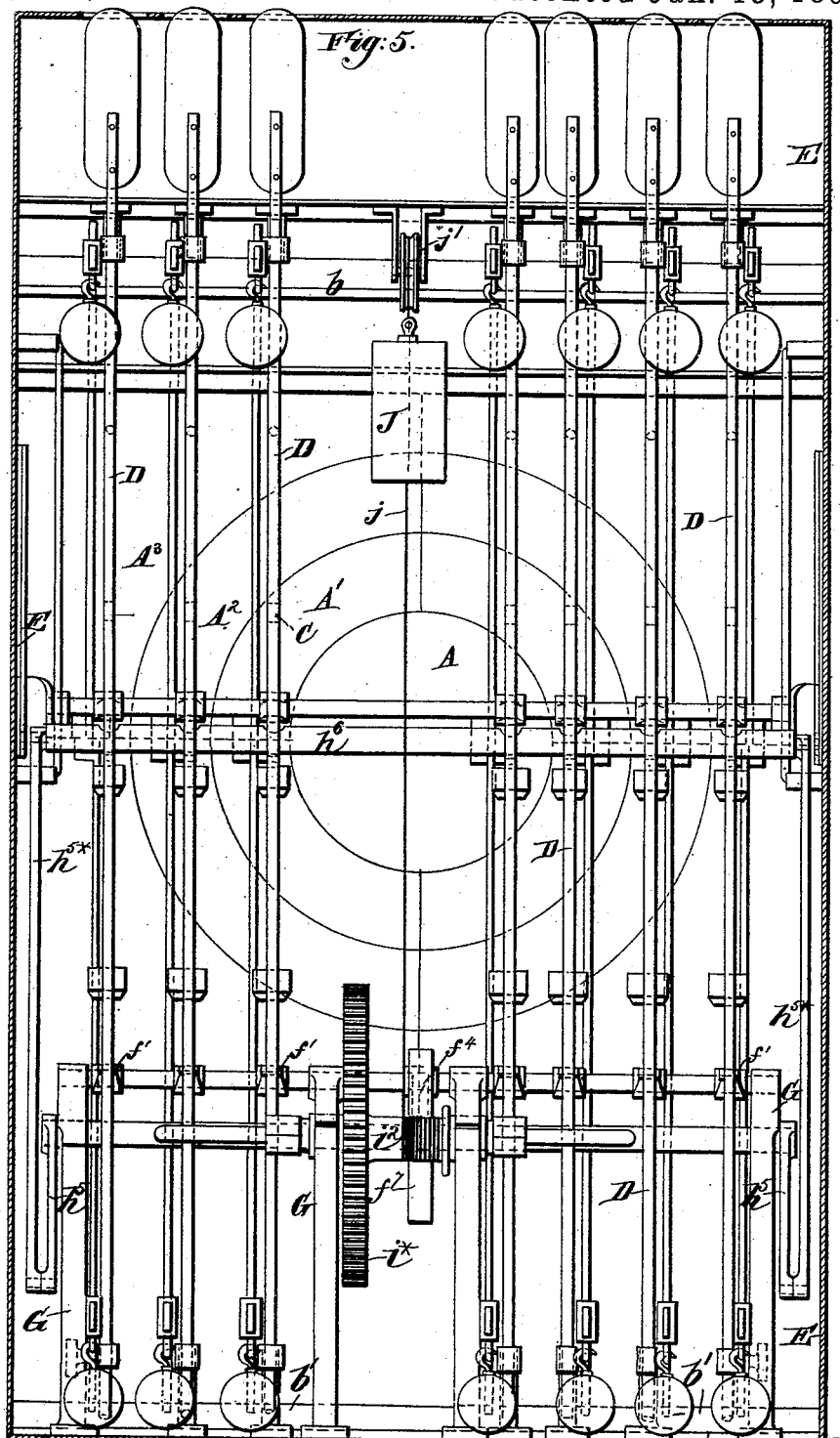

Figure 1 is a rear elevation, Fig. 2 a side elevation, and Fig. 3 is a plan, drawn to a somewhat larger scale than the two figures above referred to, of an automatic-signaling target constructed according to my invention. Fig. 4 is a detached elevation illustrating a slight modification in the mechanism that operates to return the signal-bars into their normal position. Figs. 5, 7, and 9 are rear elevations, and Figs. 6 and 8 side elevations of a target constructed according to my invention, illustrating modifications in the operating devices, and Fig. 4$^a$ is a detail view. Figs. 10 and 11 are face views of a target illustrating a modification in the arrangement of the signals.

Referring to Figs. 1, 2, and 3, A, A', A², and A³ represent, respectively, the "bull's-eye," "inner," "magpie," and "outer" rings of the target, said rings being preferably according to my invention divided still further into any convenient number of independent sections— say four, for instance. To each of these target-sections, of which I have shown thirteen, is rigidly secured the vertical arm of one or more bell-crank or angle levers B or B'. The upper series of levers B is suspended from a knife-edge bar $b$, and the lower series B' have their fulcra upon a like bar $b'$, as shown in Fig. 2, so that when a shot strikes one of the sections it will swing inwardly, the lever or levers oscillating on the knife-edge bar or bars. The rearmost ends of the outside bell-crank levers B of the upper row are provided each with a small upward extension or lug $b^2$, adapted to bear against the under side of one of the hook-shaped catches or retaining-bars C whenever the section to which it is attached is struck by a bullet. These catches C are adapted to hook over the uppermost ends of the signal bars or rods D in such a manner as to retain them in almost an upright position within the outer casing E, as illustrated in Fig. 1. The rear ends of each of the inner or central bell-crank levers B' of the lower row are connected each by a rod $b^{22}$ with the rear or inner end of one of the other signal-bar-retaining catches C, so that when one of the lower sections of the target is struck by a bullet it will release the signal corresponding to such section, and will allow it to fall into the position indicated in dotted lines in Fig. 4.

In order to automatically return the signals to their normal positions, I provide an extension $d$ on the lower end of each of the signal-rods D, and I so arrange said extension that upon the signal-rod being released it will contact with one of a pair of tie-rods or bars $f$, each extending between one of two pairs of crank-arms $f'$ $f'$, secured each to a shaft or bar $f^2$, which is journaled in suitable bearings $f^3$, secured to any convenient part of the frame-work G. These shafts or bars $f^2$ have the one a pawl $f^4$ and the other an arm $f^5$, connected with said pawl through the medium of a light connecting-rod $f^6$ and arm $f^{5*}$, so that if any of the signal-rods D are allowed to fall they will withdraw the pawl $f^4$ from engagement with the notched wheel $f^7$. This latter, together with a pair of crank-arms $h\ h$ and a pinion $i$, are all secured upon a shaft $i'$, which is supported in suitable bearings upon the frame G. Any convenient train of wheels $i^* i^*$ is arranged to gear with this pinion $i$, and upon the spindle of one of them a drum or winding-pulley $i^2$ is secured, to which is attached a length of rope or chain $j$, which is passed over suitably-arranged sheaves or pulleys $j' j'$, and has attached to its other end a comparatively heavy weight J, whose function is to rotate the shaft $i'$ upon a bullet having struck the target and released one of the signal-rods. The crank-arms $h\,h$ are connected each by a rod $h'$ with a pair of levers $h^2\,h^2$, which are fulcrumed in suitable bearings $h^3\,h^3$, secured to the frame G, and are connected by links $h^4\,h^4$ at their outer ends, each with one of a set of inwardly-projecting arms $h^5$, connected by cross-bars or tie-rods $h^6\,h^6$, the whole being so arranged that upon the release of the shaft $i'$ by a falling signal bar or bars these said bell-crank levers $h^5$ will return said signal-bar to its normal position by means of the tie-rods $h^6$.

The modification illustrated in Fig. 4 differs from the foregoing chiefly in the arrangement of the bell-crank levers $f'\,f^5$ and $f'\,f^{5*}$. Instead of carrying the crank-arm $f^{5*}$ upward, it is in this figure shown as projecting downwardly, and is connected by a short link $f^6$ with the crank-arm $f^5$, which is shaped and arranged, as shown, to correspond with the said crank-arm $f^{5*}$.

The complete cycle of movements in the automatic-signaling target (illustrated in Figs. 1, 2, and 3) is as follows: Assume, for the sake of example, that one of the upper "magpie" sections $A^2$ is struck by a bullet, then its outer supporting bell-crank lever B will be so moved as to cause the upwardly-projecting lug $b^2$ upon its end to contact with the under side of the particular catch C, with which it is constructed and arranged to correspond, and will raise its end out of engagement with the upper end of its corresponding signal-bar D, which will at once fall into the position indicated in dotted lines in Fig. 4. The downwardly-projecting end $d$ of this signal-bar will contact with the tie-rod $f$ and will therefore rock the bell-crank levers $f'\,f^5$ and $f'\,f^{5*}$, thereby withdrawing the retaining-pawl $f^4$ out of engagement with the notched wheel $f^7$ and allowing the crank-shaft $i'$ to be moved through one revolution by the weight J acting through the medium of the cord $j$, winding-drum $i^2$, and gearing $i^*$. This revolution of the shaft $i'$ will cause the crank-arms $h\,h$ on its ends to draw down the crank-arms $h^5\,h^5$, through the medium of the connecting-rods $h'\,h'$, rocking levers $h^2\,h^2$, and connecting-rods $h^4\,h^4$. The effect of this movement will be that one of the tie-rods $h^6\,h^6$ will contact with the signal-bar D that has been released and will return it to its normal position, where it will once more be retained by its catch C, while the retaining-pawl $f^4$, having once more engaged with the notched wheel $f^7$, will prevent any further movement of the signal-bar-returning devices until they are again released by the bullet striking the target. The duration of time during which such signals will be exhibited may of course be regulated to any desired extent, either by varying the gearing $i^*$ or the weight J, or by using an escapement-wheel detent and pendulum, such as are used in clocks, for instance.

In order that the different signals may be more easily distinguished, I provide a strongly-constructed flap or door K (see Fig. 3) upon each side of my target, and I hinge said door to any convenient part of the framing G or casing E, and so arrange it that when it is opened it will project outward beyond the position that the signals will occupy when released, thus providing a suitable background upon which said signals will show very prominently. It will of course be obvious that these doors or flaps must be opened to such an angle as will cause a bullet to glance off their surfaces without injuring them.

Figure 6:
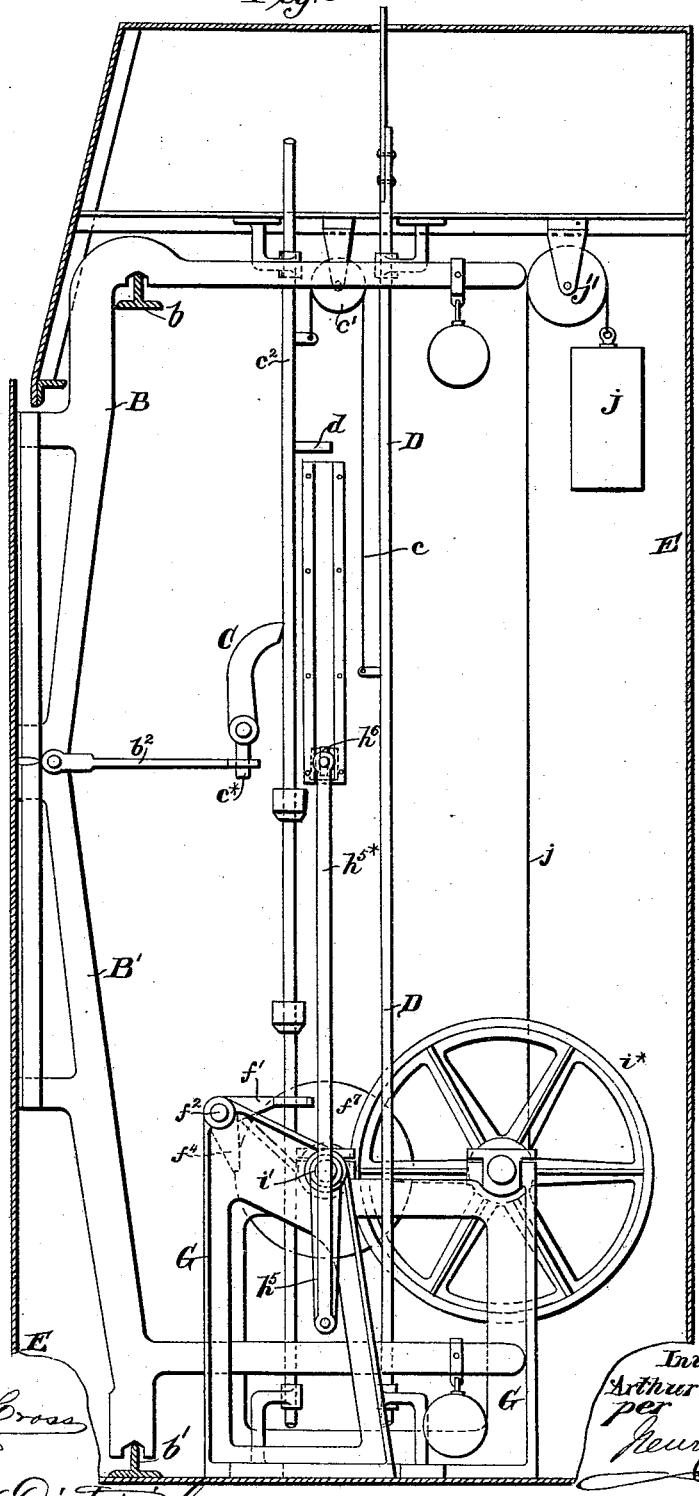
Figure 7:
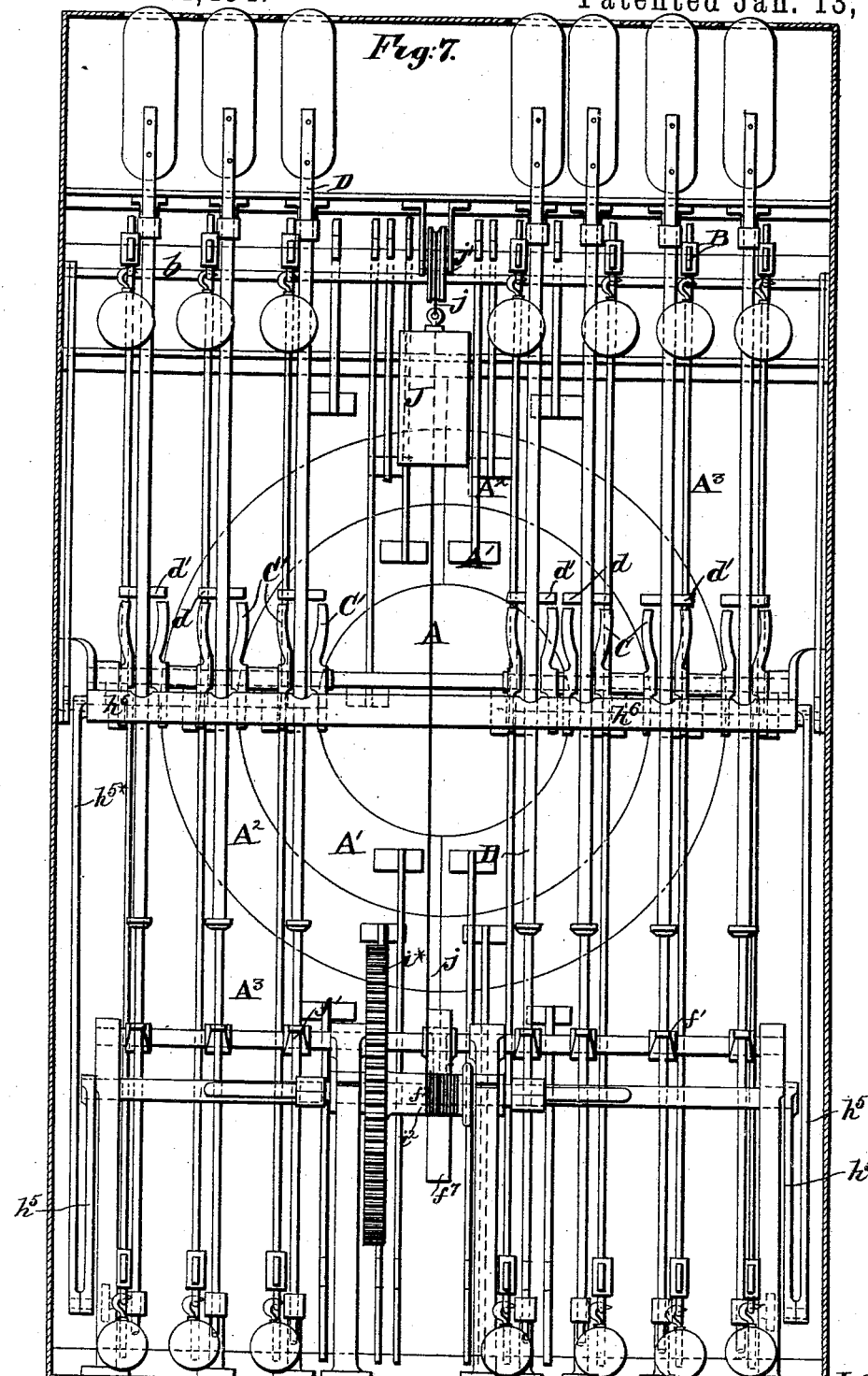

The modification of my invention which is illustrated in Figs. 5 and 6 has been devised for the purpose of obviating the difficulty of want of space which would sometimes arise in shooting-galleries and short ranges, for instance. Instead of arranging the signal rods or bars D to fall outwardly at the sides of the target, I connect them each by a flexible cord, rope, or chain $c$ (passing over a suitably-arranged pulley $c'$) with a weighted vertically-sliding rod $c^2$, which is normally held in its raised position by a pivoted pawl or catch-lever C, whose downwardly-projecting arm or lug $c^*$ is connected by a rod $b^2$, either with the lowermost extremity of one of the upper row of bell-crank levers B or else with the uppermost extremity of one of the lower row B', as clearly shown in Fig. 6. The retaining-pawl $f^4$ is in this modification rigidly connected to a number of crank-arms $f'$, (which can, if preferred, take the form of a continuous platform or bar,) through each one of which one of the weighted rods $c^2$ passes freely. These parts are so arranged that the gearing $i^*$ will be released by one of said weighted rods $c^2$ falling upon one of the crank-arms $f'$, as will be well understood.

In order to return the signals to their normal positions, I provide a vertically-sliding bar $h^6$ and connect it by rods $h^{5*}$ to the extremities of crank-arms $h^5$, keyed upon the shaft $i'$, which is adapted to be rotated by the gearing $i^*$ whenever the retaining-pawl $f^4$ is forced out of contact with the notched wheel $f^7$. This signal-returning bar $h^6$ is arranged to engage with pins $d$ projecting rearwardly from each of the weighted bars $c^2$, in order to return the signals to their normal positions after they have been released by a bullet striking the target.

The complete operation of the modified apparatus shown in Figs. 5 and 6 is substantially the same as that shown in Figs. 1 to 4—that is, the rod $c^2$ will withdraw the pawl $f^4$ by falling upon one of the crank-arms $f'$, when released by its retaining-clutch C being forced back by a bullet striking one of the sections of the target. The shaft $i'$ will then be free to rotate and will return the signals to their normal positions by raising the weight-bars $c^2$ by means of the vertically-sliding cross-bar $h^6$.

Figure 8:
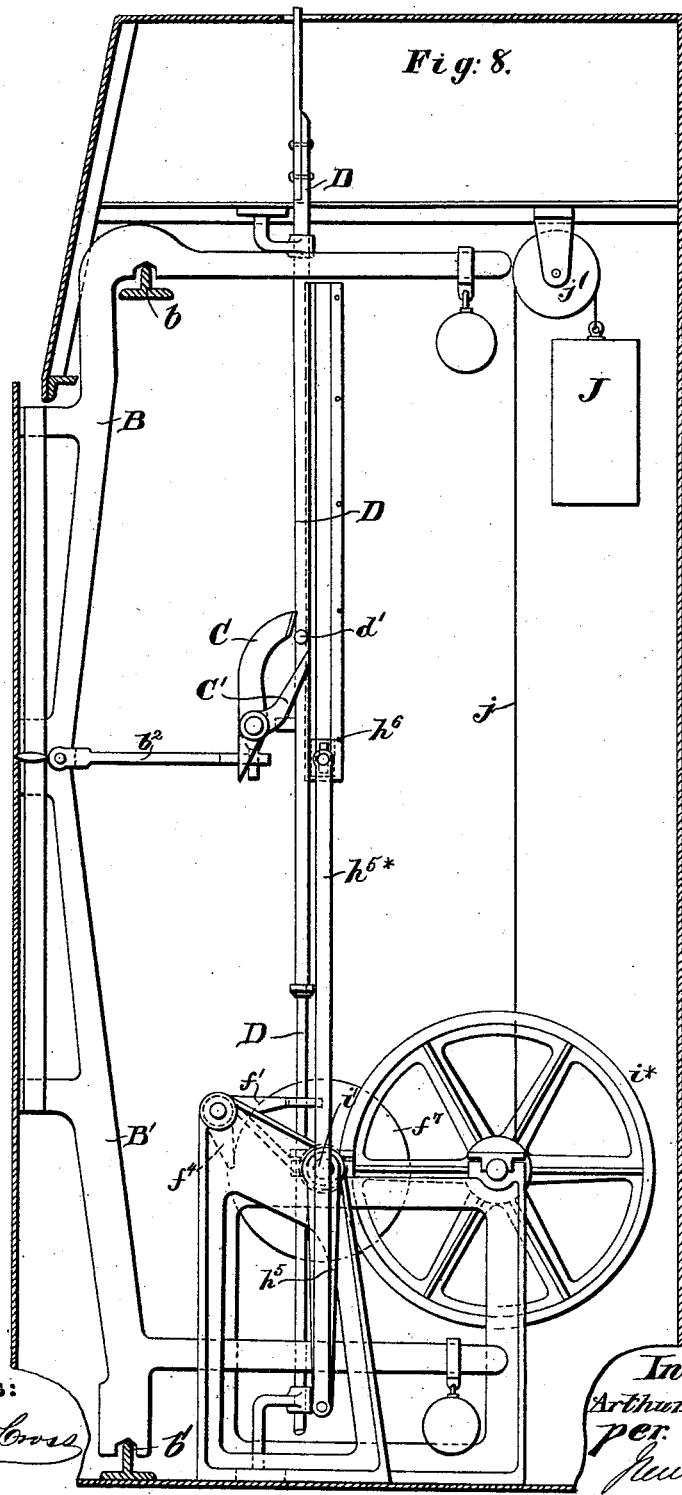

In the modification illustrated in Figs. 7, 8, and 9 the vertically-sliding rods D (upon whose upper ends the signals are fixed) are provided each with a notch or its equivalent, whereby it may be held up by a suitably-arranged retaining-pawl C, while pins $d$ $d'$ are arranged to engage each with one of a pair of inclined fingers or clutches C', suitably pivoted one on either side of each of the retaining-pawls C. The rods $b^2$, connecting these latter with the bell-crank levers B B', are so arranged that each one will not only withdraw one of the retaining-pawls C, but it will also withdraw one of the inclined pivoted fingers or clutches C' at the side thereof, so that if one of the signal-rods drops it will be turned round sidewise by one of the pins $d$ engaging with one of said inclined fingers or clutches C'. At the same time the opposite pin $d'$ will be placed in position to be engaged by the ascending bar $h^6$, whereby the signal will be carried up and exhibited above the target.

In order that a "line" shot—that is to say, a shot striking one of the divisional lines between two target-sections—may be indicated, I arrange the signals as illustrated in Figs. 10 and 11—that is, I arrange the signals of the lower sections (numbered 3 and 4 in said figures) so that they will show between the upper ones (1 and 2) and the target, thus providing for a line shot between one of said upper sections and the one next below. Those signals which are farthest behind the target—say, for instance, the ones corresponding with the magpie ring—are larger than the others, and are painted upon a suitably-constructed disk, (as indicated in hatched lines in said figures,) while the other signals consist of somewhat smaller skeleton figures, (as indicated in solid black,) so that when released they will show in front of, but will not obscure, the hinder ones, as clearly indicated in the two figures just referred to.

In order that the particular ring struck by the bullet may be at once indicated, I paint the signals some distinctive color—say red, black, and white, respectively, for the outer magpie and inner rings—and in order that the particular section struck may be indicated I number them as shown. By this means I provide for at once signaling any particular spot struck by the bullet. For instance, if a shot strikes the adjacent corners of the upper and lower left-hand sections of the magpie and inner rings, as represented in Fig. 10, the signals corresponding to such sections will be exhibited, as illustrated in said figure—that is, the signals corresponding to the two upper sections (marked 1) will appear close to the target, one over the over, while the signals corresponding to the two lower sections (marked 4) will also appear one above the other, but farther away from the target.

The signaling of the shot represented in Fig. 11 will be understood from the above description.

Having now particularly described and ascertained the nature of my said invention and in what manner the same is to be performed, I declare that what I claim is—

1. In a self-indicating target, a series of independent sections or plates constituting the face of the target, a support for each of said sections consisting of an angle-lever to the vertical arm of which the section is secured, a revoluble signal-bar for each of said sections, a signal secured thereto, and a locking-lever in engagement with the signal-bar to lock the same against rotation, and adapted to be operated by the horizontal arm of the angle-lever support, for the purposes set forth.

2. In a self-indicating target, a series of independent sections or plates constituting the face of the target, a support for each of said sections consisting of an angle-lever to the vertical arm of which the section is secured, a revoluble signal-bar for each of said sections, a signal secured thereto, and a locking-lever in engagement with the signal-bar to lock the same against rotation, and adapted to be operated by the horizontal arm of the angle-lever support, in combination with a motor, and a lifting device operated thereby and operating to return the signal-bar into engagement with the locking-lever, for the purposes set forth.

3. In a self-indicating target in which the target-face is composed of independent sections, a support for a target-section consisting of an angle-lever adapted to vibrate upon a horizontal fulcrum, to the vertical arm of which lever the target-section is rigidly secured, as set forth.

4. In a self-indicating target, a series of independent oscillatory sections or plates constituting the face of the target, in combination with a corresponding series of gravity signal-bars, a tripping device for each of said signal-bars, against which device said sections have bearing, said gravity-bars having a common center of rotation and the same amplitude of motion, and a signal secured to each of said bars, said signals being arranged relatively to one another so as to lie in different planes, substantially as and for the purposes set forth.

5. In a self-indicating target, a series of independent oscillatory sections or plates constituting the face of the target, in combination with a corresponding series of gravity signal-bars, a tripping device for each of said signal-bars, against which device said sections have bearing, said gravity-bars having a common center of rotation and the same amplitude of motion, and a signal secured to each of said bars, said signals being arranged relatively to one another so as to lie in different planes, the signals of like denomination varying in dimension, substantially as and for the purposes set forth.

6. In a self-indicating target, a series of independent oscillatory sections or plates constituting the face of the target, in combination with a corresponding series of gravity signal-bars, a tripping device for each of said signal-bars, against which device said sections have bearing, said gravity-bars having a common center of rotation and the same amplitude of motion, and a signal secured to each of said bars, said signals being arranged relatively to one another so as to lie in different planes, the signals of like denomination varying in dimension and in color, substantially as and for the purposes set forth.

7. In a self-indicating target, independent oscillatory sections or plates arranged in groups and constituting the face of the target, in combination with a gravity signal-bar for each of said sections, a tripping device for each signal-bar, against which device said sections have bearing, said bars being arranged in groups, each group having a common center of rotation and the same amplitude of motion, and a signal secured to each of said bars, the signals for each group of plates being arranged relatively to one another so as to lie in the same plane, the groups of signals being arranged in different planes and of successively-increasing dimension, substantially as and for the purposes set forth.

8. The combination of a casing E, provided with shutters K on opposite sides, and a target composed of a plurality of yielding sections arranged in the front of the casing, with a gravity signal-bar for each target-section adapted to drop in front of said shutters, and a detent for each signal-bar adapted to lock the same into a normal position and to be released by the movement of its target-section under the impact of a bullet, as and for the purposes specified.

9. The combination of a casing E, provided with shutters K on opposite sides, and a target composed of a plurality of yielding sections arranged in front of the casing, with a gravity signal-bar for each target-section adapted to drop in front of said shutters, and a detent for each signal-bar adapted to lock the same into a normal position and to be released by the movement of its target-section under the impact of a bullet, and a motor adapted to automatically return a signal-bar to its normal position after being released from the detent, as and for the purposes specified.

10. The combination, with a casing E, provided with shutters K on opposite sides, and a target composed of a plurality of yielding sections arranged in front of the casing, of a gravity signal-bar for each target-section adapted to drop in front of said shutters, and a detent for each signal-bar adapted to lock the same into a normal position and to be released by the movement of its target-section under the impact of a bullet, a motor adapted to return a signal-bar to its normal position after being released from the detent, and a detent adapted to lock the motor against operation and to be tripped by a signal-bar when released, as and for the purposes specified.

ARTHUR THOMAS METCALF JOHNSON.

Witnesses:
WALTER SMYTHE BAYSTON,
WALKER CHARLES HART.